United States Patent [19]

Suzuki

[11] Patent Number: 4,879,922

[45] Date of Patent: Nov. 14, 1989

[54] OPERATING DEVICE FOR TRANSMISSION

[75] Inventor: Kazuhiro Suzuki, Nishinomiya, Japan

[73] Assignee: Nippon Cable System Inc., Takarazuka, Japan

[21] Appl. No.: 39,863

[22] Filed: Apr. 20, 1987

[30] Foreign Application Priority Data

Sep. 2, 1986 [JP] Japan .............................. 61-206436

[51] Int. Cl.⁴ ............................. G05G 9/16; F16C 1/10
[52] U.S. Cl. ............................. 74/500.5; 74/471 XY; 74/473 R; 74/473 P
[58] Field of Search ............... 74/473 R, 471 XY, 476, 74/500.5, 501.6, 473 P

[56] References Cited

U.S. PATENT DOCUMENTS

| | | | |
|---|---|---|---|
| 4,156,474 | 5/1979 | Aida | 74/473 R |
| 4,245,521 | 1/1981 | Osborn | |
| 4,458,549 | 7/1984 | Tani et al. | 74/473 R |
| 4,524,634 | 6/1985 | Haupt | 74/473 R |
| 4,543,842 | 10/1985 | Katayama | 74/473 P |
| 4,651,583 | 3/1987 | Suzuki | 74/526 X |
| 4,693,135 | 9/1987 | LaRocca et al. | 74/473 R |
| 4,726,249 | 2/1988 | Inuzuka et al. | 74/473 P |

FOREIGN PATENT DOCUMENTS

| | | | |
|---|---|---|---|
| 80338 | 4/1951 | Czechoslovakia | 74/471 XY |
| 2288641 | 5/1976 | France | 74/473 P |
| 58-37722 | 3/1983 | Japan | 74/473 R |
| 58-161621 | 9/1983 | Japan | 74/473 R |
| 58-192118 | 11/1983 | Japan | 74/471 XY |
| 59-49536 | 4/1984 | Japan . | |
| 59-173809 | 10/1984 | Japan | 74/471 XY |
| 60-134922 | 7/1985 | Japan | 74/473 R |
| 1017526 | 5/1983 | U.S.S.R. | 74/473 R |

Primary Examiner—Rodney M. Lindsey
Attorney, Agent, or Firm—Armstrong, Nikaido, Marmelstein, Kubovcik & Murray

[57] ABSTRACT

An operating device for transmission comprising a change lever, a shift cable connected to the change lever, a bell crank, a select cable connected to the first arm of the bell crank, a bearing base, an operating shaft of which the middle part is fixed with the change lever, a first bearing provided on the bearing base to be connected with a supported end of the operating shaft rotatably and inclinably, a second bearing provided at the free end of the operating shaft for the rotatable connection with the second arm of the bell crank, a fixed shaft, of which one end is fixed to the bearing base, projecting from the bearing base, a third bearing provided at the other end of the fixed shaft to support the middle part of the bell crank rotatably and a spring disposed so as to be inserted by the fixed shaft with both ends fixed to the operating shaft. The operating device has an advantageous compact construction because the change lever can be disposed near the center of the device and no additional space is required for the inclination of the change lever. Further the device can be assembled and installed easily and economically because all major parts are mounted on the two shafts and the device can be pre-assembled prior to the installation thereof.

4 Claims, 11 Drawing Sheets

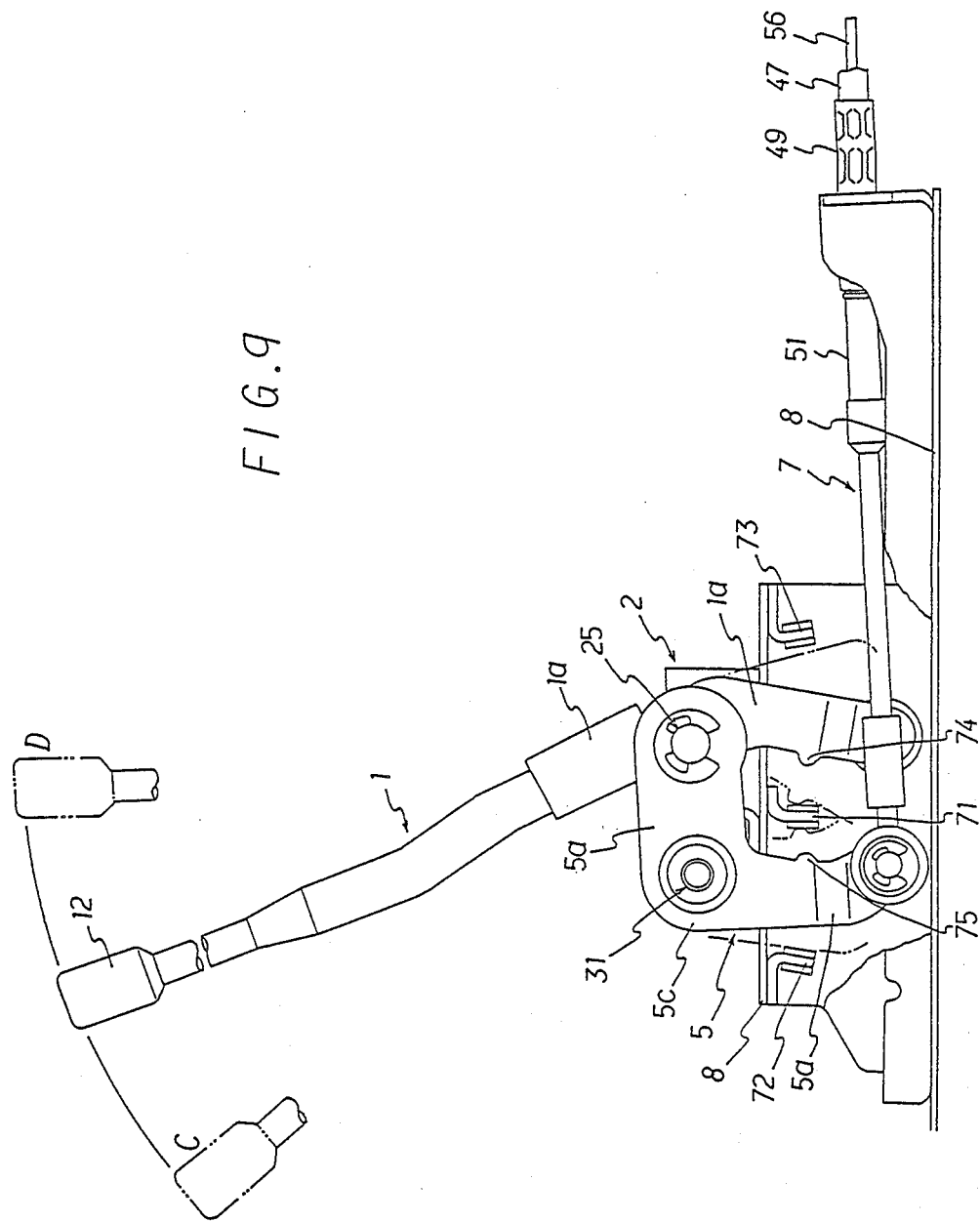

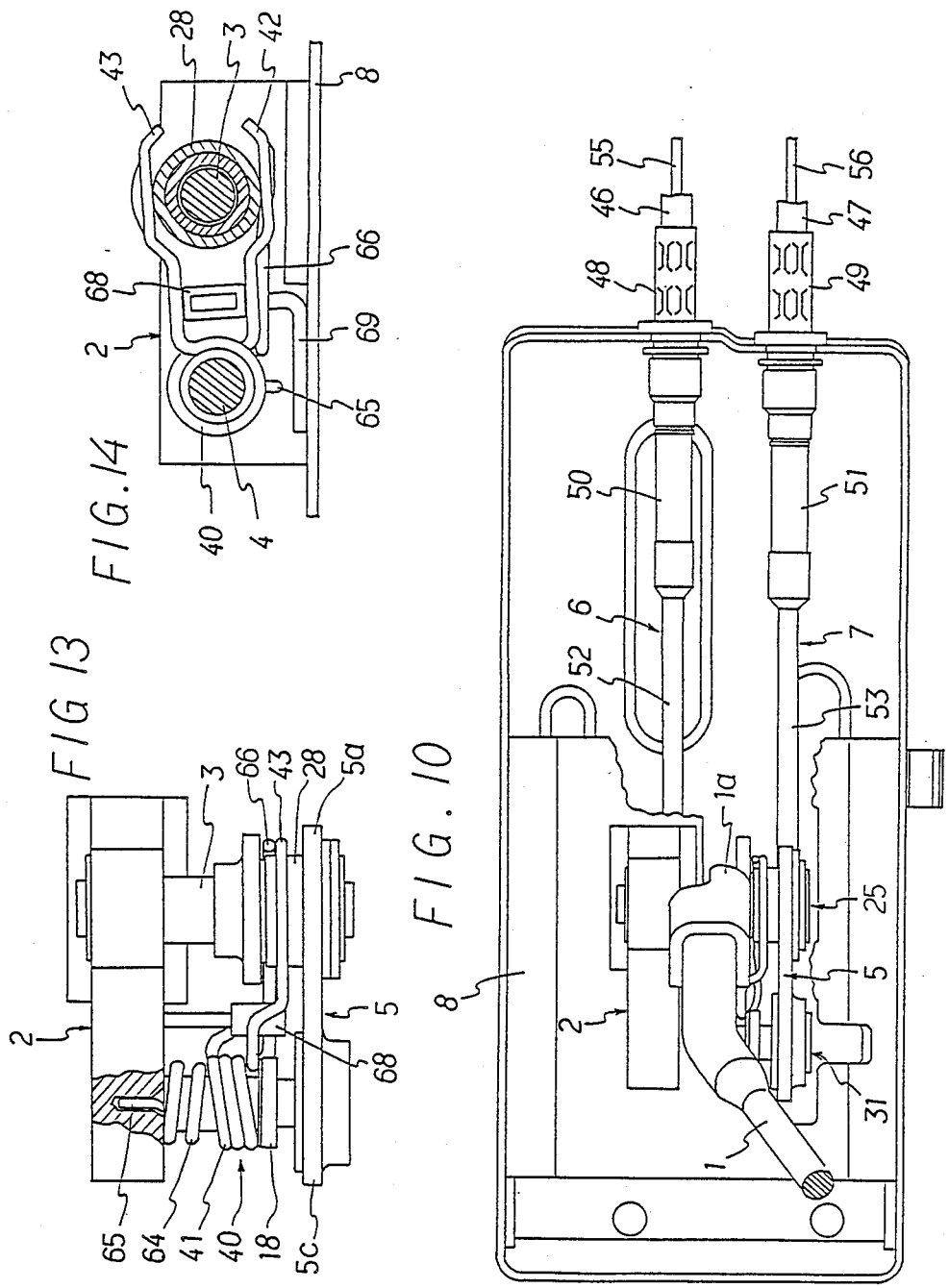

OPERATING DEVICE FOR TRANSMISSION

BACKGROUND OF THE INVENTION

The present invention relates to an operating device used for an automotive transmission, and more particularly to an operating device utilizing a push-pull control cable or push-pull control cables (hereinafter denoted by a cable or cables, respectively) as a means for transmitting operating force.

Recently, a transmission operating device employing control cable is used as a remote operating means for a transmisstion of a front-wheel-drive small automobile having a front engine or a rear-wheel-drive bus or truck having a rear engine. The cable type operating device has advantages, for example, that the device is light and economical and that the device allows relatively free selection in the disposition thereof.

A conventional example of the cable type operation device is described in Japanese Unexamined Utility Model Publication No. 49536/1984. The conventional device is explained here referring to FIGS. 15 to 16.

A bottom end of a change lever 104 is directly connected to a ball joint 106 which utilizes a ball 105, and the ball joint 106 is fixed to a housing 101 with peripheral four bolts 102. A pin 107 is fixed to the ball 105 with projecting laterally. The end of the pin 107 is connected to the second arm of a bell crank 103 via a spherical bearing 108 The bell crank 103 is supported in the middle by a hinge 111 fixed to the housing 101, and the first arm 112 of the bell crank 103 projects upward with inclination. A bracket 113 on the change lever 104 is connected with a shift cable 110, while the first arm 112 of the bell crank 103 is connected with a select cable 109.

When the change lever 104 is moved laterally to the cables, the pin 107 moves upward or downward and the bell crank 107 rotates and consequently the select cable 109 is pushed or pulled to provide a selecting operation. When the change lever 104 is moved parallel to the cables subsequent to the above operation, the shift cable 110 is pushed or pulled to provide a shifting operation.

In the above mentioned conventional device, the universal joint 106 should be disposed one-sidedly in the housing 101, because the universal joint 106 is fitted with a laterally projecting pin 107. Accordingly, the location of the change lever 104 is also one-sidedly in the housing 101, and the housing 101 should have an additional space to allow the change lever to incline. Therefore, the conventional device has a problem that the device requires relatively large installation space.

In addition, the conventional device has another problem that the assembly work thereof is hard. Because, the conventional device has a construction, wherein the parts such as the universal joint 106 and hinge 111 are fastened individually to the housing 101 by bolts or the like, and requires many assembling steps, many dimensional adjustments in disposing those parts as the result.

The present invention was made considering the above mentioned problems, and an object of the invention is to provide an operating device for a transmission which can be installed in a small space and can be assembled easily.

SUMMARY OF THE INVENTION

In accordance with the present invention, there is provided an operating device for transmission comprising a change lever; a shift cable connected to the change lever; a bell crank; a select cable connected to the first arm of the bell crank; a bearing base; an operating shaft of which the middle part is fixed with the change lever; a first bearing provided on the bearing base to be connected with a the supported end of the operating shaft rotatably and inclinably; a second bearing provided at the free end of the operating shaft for the rotatable connection with the second arm of the bell crank; a fixed shaft, of which one end is fixed to the bearing base, projecting from the bearing base; a third bearing provided at the other end of the fixed shaft to support the middle part of the bell crank rotatably; and a spring disposed so as to be inserted by the fixed shaft with both ends fixed to the operating shaft.

In a device of the present invention, when the change lever is inclined in the direction parallel to the axis of the operating shaft, the free end of the operating shaft moves upward or downward. At the same time, the second arm of the bell crank, connected at the free end of the operating shaft via the second bearing, moves upward or downward, and the bell crank rotates around the third bearing at the end of the fixed shaft. By the above rotation of the bell crank, the select cable connected to the first arm of the bell crank is pushed or pulled to provide a selecting operation. When the change lever is inclined in the direction perpendicular to the axis of the operating shaft subsequent to the above operation, the change lever turns around the operating shaft and the shift cable connected to the change lever is pushed or pulled to provide a shifting operation.

Thus, in a device of the present invention, when the change lever is moved in accordance with the same pattern as the conventional H-pattern or the like, both selecting and shifting operations are achieved to operate a transmission.

The change lever in a device of the present invention is fixed to the middle point of the operating shaft, namely, the change lever is located between the bearing base and the bell crank. Therefore, the change lever can be disposed near the center of the device, and in case that the device is mounted in a housing, the change lever can be disposed at the center of the hounsing. By virtue of the above disposition, the housing can be sized based on the space for the installation of the bearing base and the bell crank, and no additional space is required in the housing to allow the inclination of the change lever Accordingly, a device of the present invention can make a housing therefor small.

Further, in the device of the present invention, all major parts such as the change lever and the bell crank are mounted on two shafts (i e the operating shaft and the fixed shaft) projecting from the bearing base. By virtue of the above construction, the operating device can be handled as an independent assembly. Therefore, the assembly work of the device including the dimensional adjustment in the parts arrangement can be easily carried out before the installation thereof. Then the installation work also can be easily carried out because the above dimentional adjustment is not required in the installation work. Consequently, the required man-hours for the assembly work and installation work can be considerably reduced.

BRIEF DESCRIPTION OF THE DRAWINGS

The features and advantages of the operating device for a transmission of the present invention will become more clearly appreciated from the following description in conjunction with the accompanying drawings, in which:

FIG. 9 is a front view of the operating device illustrated in FIG. 8;

FIG. 10 is a plan view of the operating device illustrated in FIG. 8;

FIG. 13 is an enlarged plan view of the major portion of the operating device illustrated in FIG. 8;

FIG. 14 is an enlarged front view of the major portion of the operating device illustrated in FIG. 8;

DETAILED DESCRIPTION

First, a first embodiment of the present invention is explained referring to FIGS. 1 to 7.

Figure 1:
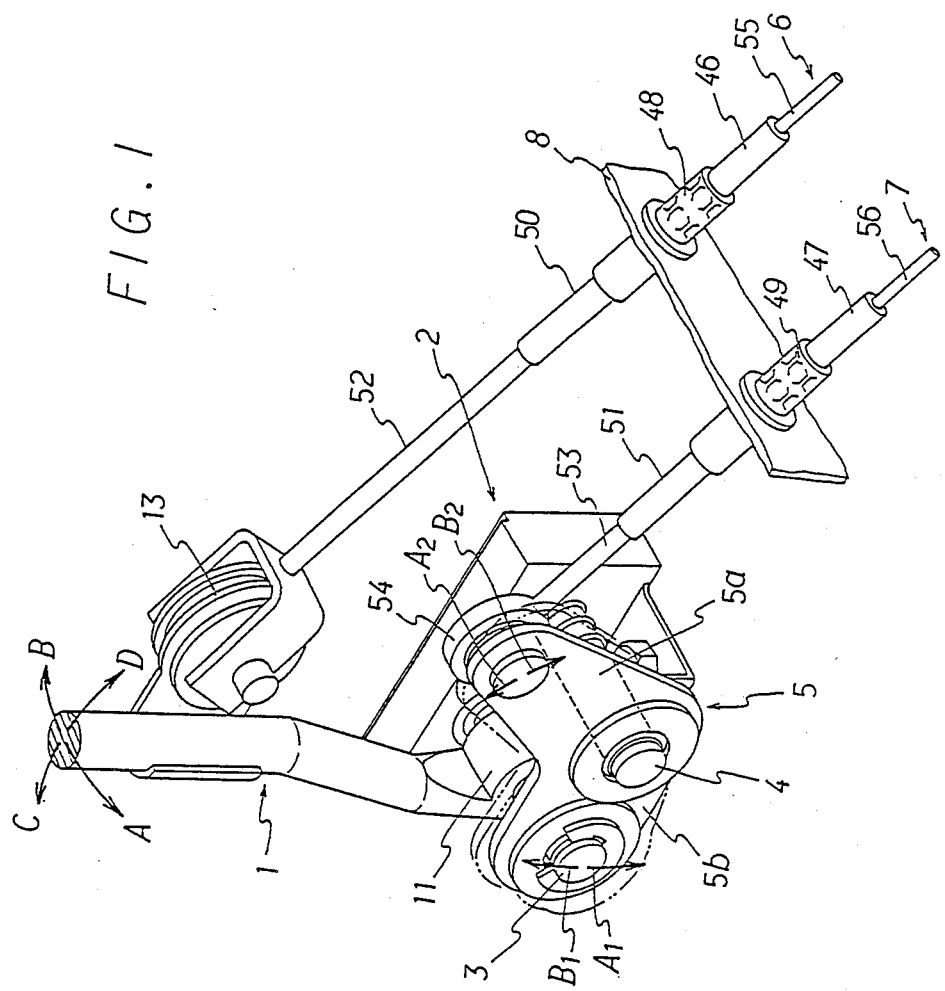
FIG. 1 is a perspective view of an operating device for a transmission of a first embodiment of the present invention.

FIG. 1 shows a change lever 1, a bearing base 2, an operating shaft 3, a fixed shaft 4 and a bell crank 5.

Figure 6:
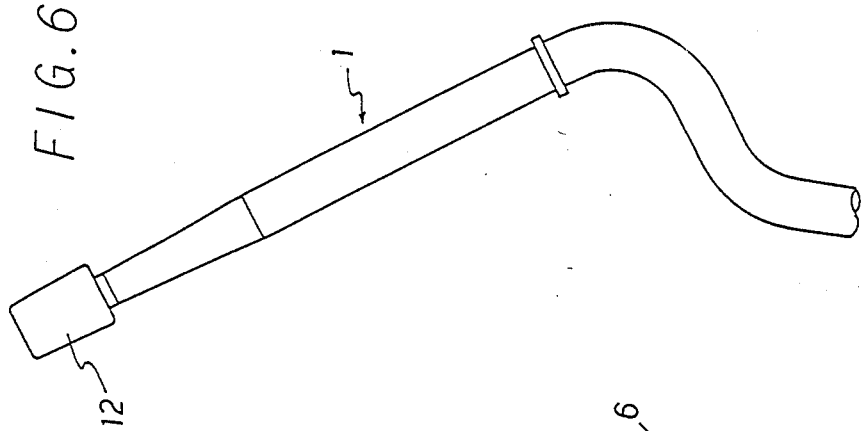
FIG. 6 is a front view of the upper portion of a change lever in the present invention.

In the first embodiment, the lower end of the change lever 1 is fixed to the operating shaft 3. Namely, the lower end of the change lever has a boss 11 which is fixed to the operating shaft 3. The shape of the change lever 1 does not restricted, therefore the change lever 1 can be a straight one or can have any other shape. FIG. 6 shows the upper portion of the change lever 1 which is bent in the middle portion The change lever 1 has a grip 12 at the upper end thereof.

The middle portion of the change lever 1 is fitted with a bracket 13 to which a shift cable 6 is connected.

The bell crank 5 has the first arm 5a and the second arm 5b. The end of the first arm 5a is equipped with an adequate spherical bearing to which a select cable 7 is connected.

Figure 2:
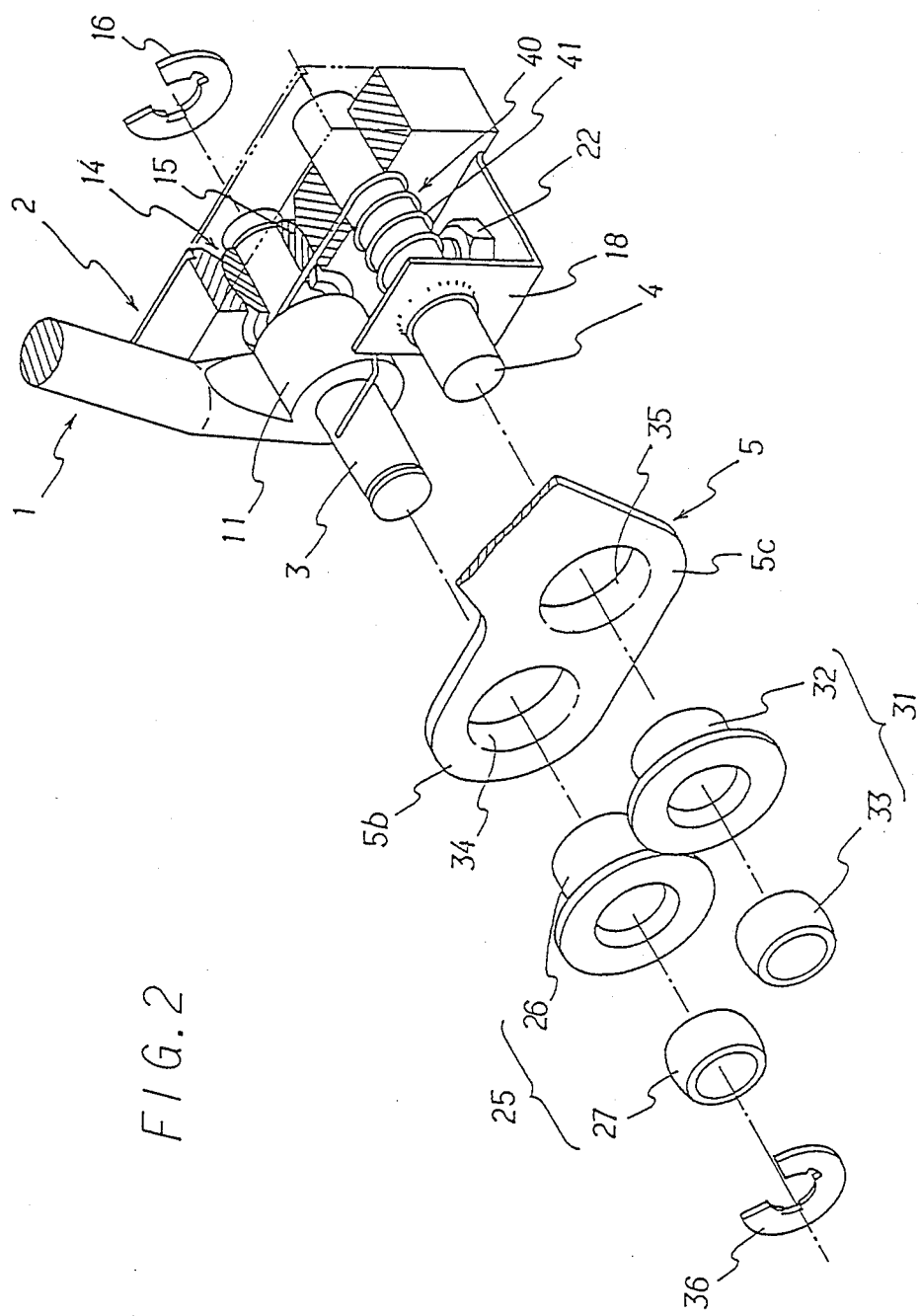
FIG. 2 is an exploded view in perspective of the operating device illustrated in FIG. 1.

There is explained in detail the construction of the first embodiment referreing to FIG. 2.

Figure 5:
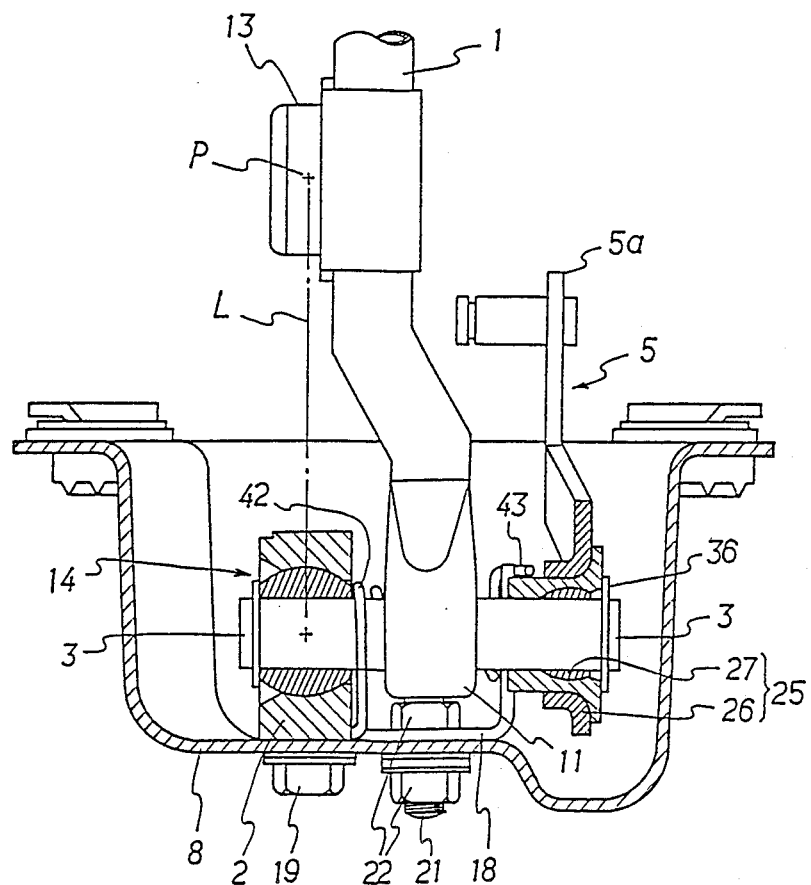
FIG. 5 is a sectional view of the operating device illustrated in FIG. 1.

The bearing base 2 is a block having a nearly rectangular shape and i suitably designed to be mounted in a housing 8 by means of bolts and nuts 19 or the like as shown in FIG. 5. The bearing base 2 is made of zinc alloy, aluminum or the like by means of die-casting.

The supported end of the operating shaft 3 is supported rotatably and inclinably by the bearing base 2 via a spherical bearing i.e. a first bearing 14. The first bearing 14 can be a conventional spherical bearing which has a ball and a separate socket surrounding the sphere. However, in the first embodiment, an integrated type spherical bearing is used wherein a ball 15 is directly mounted in the bearing base 2 and no separate socket is used. Namely, the bearing base 2 also serves as a socket. By virtue of the above mentioned construction, the portion around the first bearing 14 of the first embodiment is very compact. The ball 15 can be made of any metal of which the melting point is higher than that of the metalic material of the bearing base 2. For example, there can be used a stainless steel of a bearing-use steel designated as SUJ in Japanese Industrial Standard (JIS). The ball 15 having a bore is prepared prior to the casting of the bearing base 2, and set at the prespecified position in a mold for die-casting. Then molten metal is poured into the mold to obtain the bearing base 2 integrated with the ball 15. Next, the supported end of the operating shaft 3 is inserted through the bore of the ball 15 and fixed to the ball by a snap ring 16 being engaged thereto. Thus the operating shaft 3 is mounted on the bearing base 2 with being allowed to incline freely on the first bearing 14 and to rotate freely around the axis of itself.

The fixed shaft 4 is fixed to the bearing base 2 so as to project in the same direction as the operating shaft 3. The fixed shaft 4 is directly fixed to the bearing base 2 without using any interpositions such as ball. One end of the fixed shaft 4 is set at the prespecified position in a mold for die-casting of the bearing base 2 as well as the ball 15 for the operating shaft 3, prior to the pouring of the bearing base 2. The other end of the fixed shaft is inerted into an opening 23 of a bracket 18 to be supported firmly.

Figure 7:
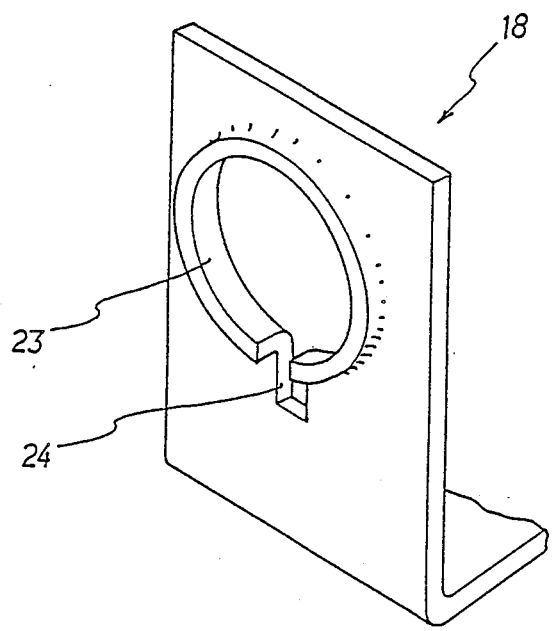
FIG. 7 is a perspective view of a bracket 18.

The bracket 18 is made of a steel plate having an L-like shape when viewed from side and is fixed on a housing 8 by a bolt 21 and nuts 22 as illustrated in FIG. 5. The bracket 18 has an opening 23 prepared by means of burring, and the opening 23 has a slit 24 at the bottom thereof as illustrated in FIG. 7. The inside diameter of the opening 23 is slightly smaller than the outside diameter of the fixed shaft 4 which is to be inserted into the opening 23 so that the opening 23 can expand slightly by virtue of the slit 24 when the fixed shaft 4 is inserted thereinto and can tighten the fixed shaft 4 elastically to fix it. Accordingly the fixed shaft 4 is fixed not to be allowed to incline or to rotate.

Figure 3:
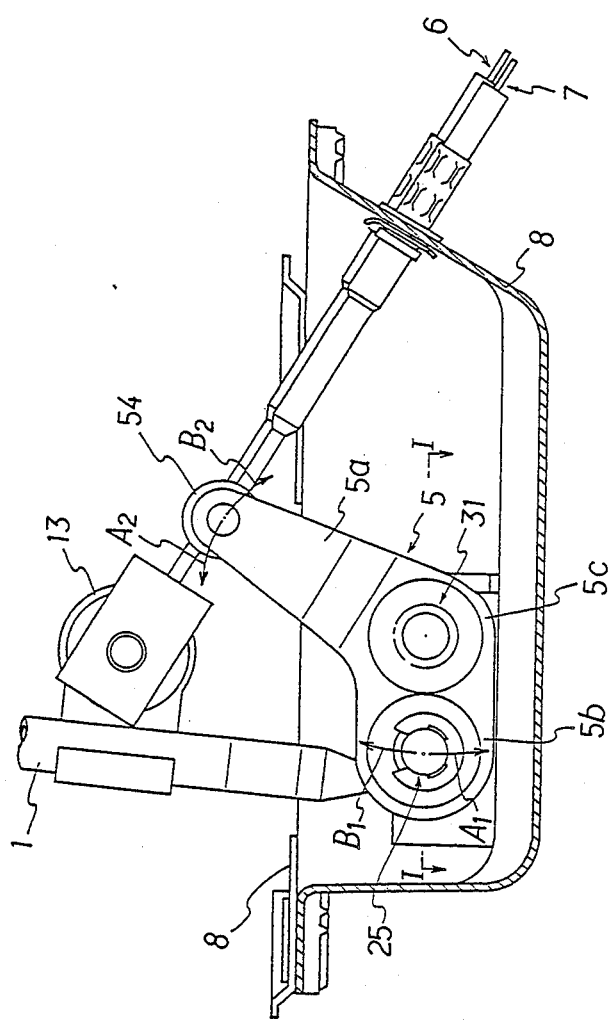
FIG. 3 is a front view of the operating device illustrated in FIG. 1.
Figure 4:
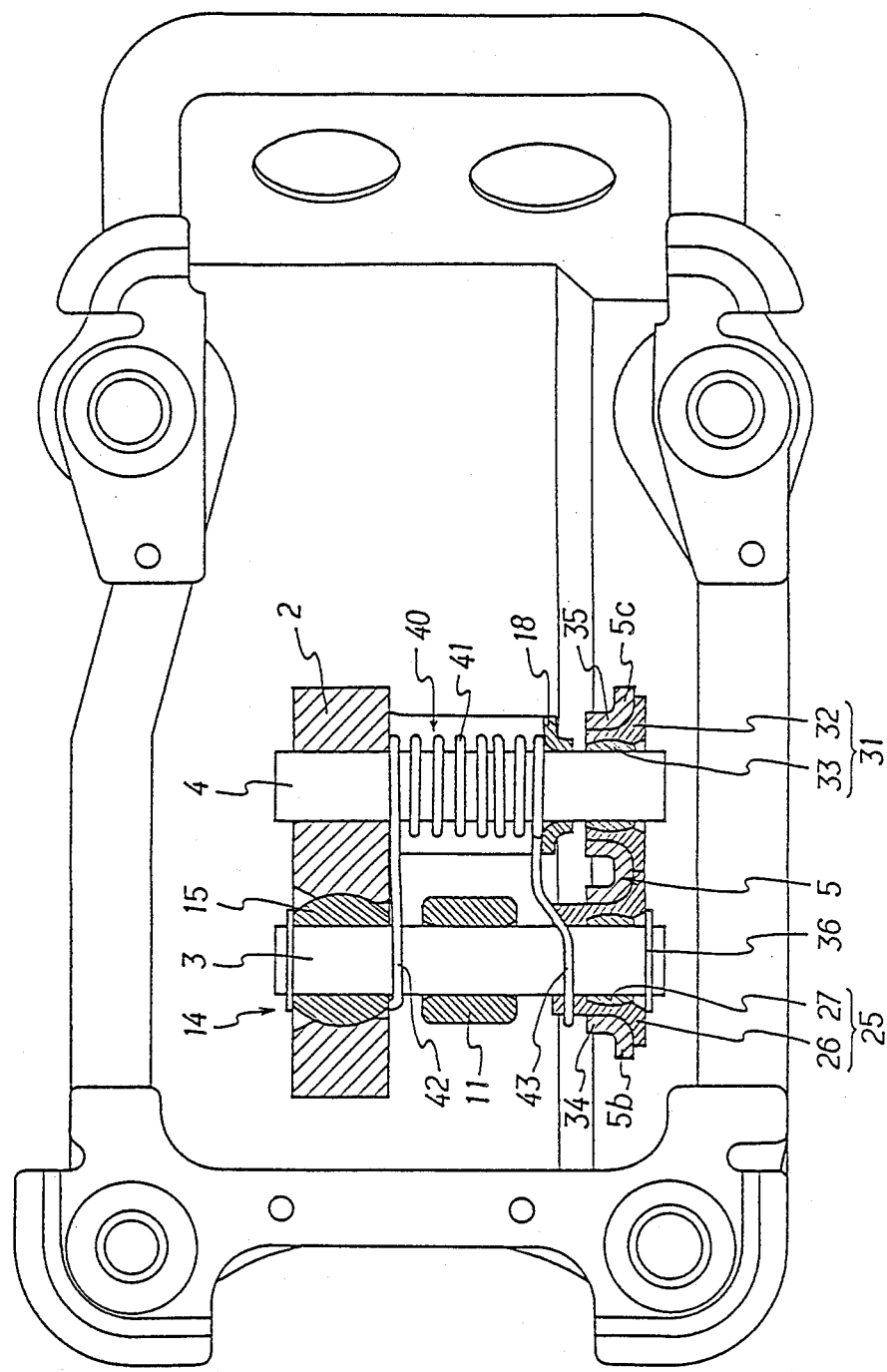
FIG. 4 is a sectional view, taken along the plane as indicated with the line I—I of FIG. 3.

The bell crank 5 has the first arm 5a, the second arm 5b and the center portion 5c disposed in angled relationship as illustrated in FIG. 3. The second arm 5b is connected to the free end of the operating shaft 3 via a second bearing 25, and the center portion 5c is supported by the end of the fixed shaft 4 via a third bearing 31. The second bearing 25 consists of a flanged tubular socket 26 and a bored ball 27, and the third bearing 31 consists of a flanged tubular socket 32 having shorter tube and a bored ball 33. Sleeves 34 and 35 are provided at the second arm 5b and the center portion 5c of the bell crank 5 to be inserted with the above sockets 26 and 32 respectively. The second bearing 25 is inserted into the sleeve 34 and the third bearing 31 is inserted into the sleeve 35 as shown in FIG. 4. Then the operating shaft 3 and the fixed shaft 4 are inserted into the second bearing 25 and the third bearing 31 respectively to mount the bell crank 5. At the end of the operating shaft 3, a snap ring 36 is engaged in order to prevent the second arm 5b from disconnecting.

As described above the bell crank 5 is supported at the center portion 5c, FIGS. 2 and 3, rotatably and inclinably by the fixed shaft 4, and the second arm 5b is connected to the free end of the operating shaft 3 rotatably but not inclinably. Accordingly when the second arm 5b is moved along an arrow A1 indicated in FIG. 3, the first arm 5a moves along an arrow A2. On the contrary, when the second arm 5b is moved along an arrow B1, the first arm 5a moves along an arrow B2. Those actions take place when the change lever 1 is inclined in the directions indicated as A and B in FIG. 1.

Further in the FIG. 2, a spring 40 is indicated. The spring 40 is a torsional coil spring which forms a barrel 41 wound around a part of the fixed shaft between the bearing base 2 and the bracket 18. One end 42 of the spring 40 is extended over the operating shaft 3 and finally fixed in the bearing base 2 by hooking, while the other end 43 is received by the top surface of the socket 26 of the second bearing 25 as illustrated in FIGS. 4 to 5. By the spring 40, the operating shaft 3 is always forced to incline toward the arrow A1 indicated in FIGS. 1 and 3 in order to prevent the change lever 1 from undesirably moving due to the play. Since the end 43 is received by the socket 26, the spring 40 has no contact with the operating shaft 3. Therefore the rotation of the operating shaft 3 is not disturbed by the friction between the spring 40 and the operating shaft 3, and shift operation accompanying the rotation of the operating shaft 3 can be smoothly achieved. Other type of spring than the torsional coil spring can serve as the spring 40.

A shift cable 6 and a select cable 7 are connected respectively in a manner indicated in FIG. 1. Conduits 46, 47 are respectively fixed to the wall of the housing 8 using cable caps 48, 49. The respective cable caps 48, 49 are fitted with guide pipes 50, 51. Rods 52, 53 are respectively inserted into the guide pipes 50, 51. The exposed end of the rod 52 is connected to the bracket 13 on the change lever 1, while the other end thereof is connected to an inner cable 55 in the conduit 46. The exposed end of the rod 53 is connected to a bearing 54 provided at the end of the first arm 5a of the bell crank 5, while the other end thereof is connected to an inner cable 56 in the conduit 47. Therefore, the shift cable 6 is pushed or pulled when the change lever 1 is inclined axially to the shift cable 6, and the select cable 7 is pushed or pulled when the bell crank 5 is rotated.

In the first embodiment, a connecting point P of the shift cable 6 to the bracket 13 on the change lever 1 is disposed in a vertical plane passing through the center of the first bearing 14 in the bearing base 2 fixed by bolt 19 and supporting the operating shaft 3. The above vertical plane is indicated by the line L in FIG. 5. By virtue of the above disposition, the shift cable 6 can be prevented from being pushed or pulled undesirably when the change lever 1 is inclined laterally to the cable for a selecting operation.

Next, the function of the first embodiment is explained referring to FIG. 1.

The change lever 1 can be inclined in accordance with a conventional H-pattern, because the change lever 1 is supported by the first bearing 14 via the operating shaft 3. When the change lever 1 is inclined in the direction A, the free end of the operating shaft 3 is moved downward in the direction of the arrow A1. Then the movement rotates the bell crank 5 so that the first arm 5a moves in the direction of the arrow A2. As the result, the inner wire 56 of the select cable 7 is pulled to provide a select operation of a gear in a transmission (not shown in FIG. 1). On the contrary, when the change lever 1 is inclined in the direction B, the free end of the operating shaft 3 moves upward in the direction of the arrow B1. Then the bell crank 5 is rotated so that the first arm 5a moves in the direction of the arrow B2. As the result, the inner wire 56 of the select cable 7 is pushed to provide a select operation of another gear in a transmission.

Subsequent to the above select operation, when the change lever 1 is inclined in the direction of the arrow C or the arrow D, a shifting operation is provided. Namely, when the change lever 1 is inclined in the direction C, the inner wire 55 of the shift cable 6 is pulled to provide a shift operation of a gear in a transmission. On the contrary when the change lever 1 is inclined in the direction D, the inner wire 55 of the shift cable 6 is pushed to provide a shift operation of another gear in a transmission.

As described above, the first embodiment enables an operation of a transmission in the same manner as in case of a conventional operating device, while has an advantageous compact construction. In the first embodiment, the change lever 1 is mounted on the middle portion of the operating shaft 3, namely between the bearing base 2 and the bell crank 5. Accordingly, the change lever is located near the center of the operating device and can be disposed at the center of the housing 8 when the device is mounted in the housing 8. When the above arrangement is employed, housing 8 can be sized based on the space required for the arrangement of the bearing base 2 and the bell crank 5, and no additional space is required in a housing to allow the inclination of the change lever 1. Accordingly, the housing 8 can be made small.

Further, in the first embodiment, all major parts such as the change lever 1 and the bell crank 5 are mounted on two shafts (i.e. the operating shaft 3 and the fixed shaft 4) projecting from the bearing base 2. By virtue of the above construction, the operating device can be handled as an independent assembly. Therefore, the assembly work of the device including the dimensional adjustment in the parts arrangement can be easily carried out before the installation thereof, then the installation work also can be easily carried out because the above adjustment is no longer required in the installation work. Consequently, the required man-hours for the assembly work and installation work can be considerably reduced.

Further, in the first embodiment, the first bearing 14 is provided in the bearing base 2 integratedly without having a separate socket. The fixed shaft 4 is directly fixed in the bearing base 2. That construction eliminates useless space and make the device very compact. In addition, the bracket 18 is a stamped plate in which only an opening with a slit is provided to tighten the fixed shaft 4. This construction is also effective in considerable space saving.

Next, a second embodiment of the present invention is explained referring to FIGS. 8 to 14.

A part in the second embodiment substantially corresponding to a part in the first embodiment previously mentioned is denoted by the same number as the correspondent in the first embodiment.

Figure 8:
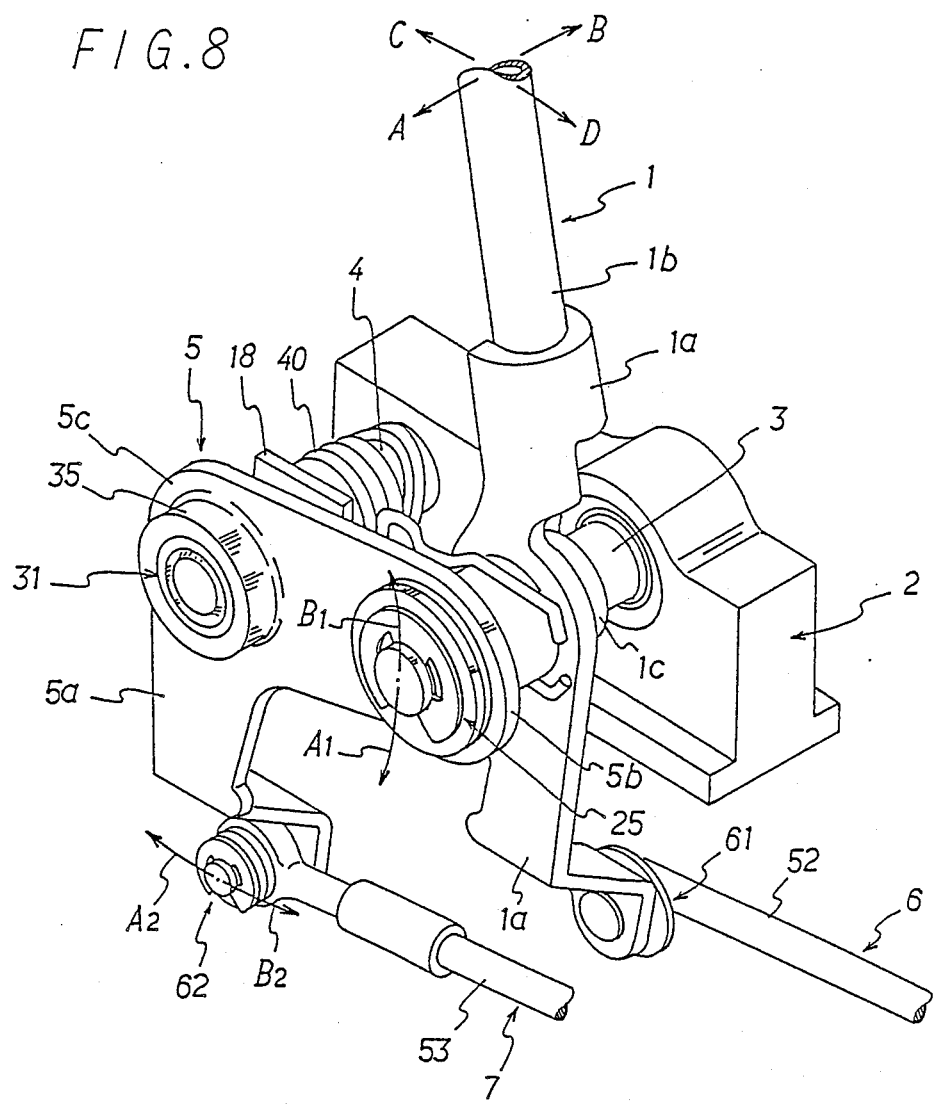
FIG. 8 is a perspective view of an operating device for a transmission of a second embodiment of the present invention.

As shown in FIG. 8, the middle portion of a change lever 1 is fixed to an operating shaft 3. The operating shaft 3 and a fixed shaft 4 are disposed in the reverse order in the arrangement of these two shafts and cables, compared with the first embodiment, and a first arm of a bell crank 5 is mounted downward in the second embodiment.

The change lever 1 in the second embodiment consists of a bar 1b and an adaptor lever 1a of which the upper end is connected to the lower end of the bar 1b. A hub 1c is formed at the center portion of the adaptor lever 1a, and engaged tight to the operating shaft 3 to fix the change lever 1 to the operating shaft 3.

Figure 11:
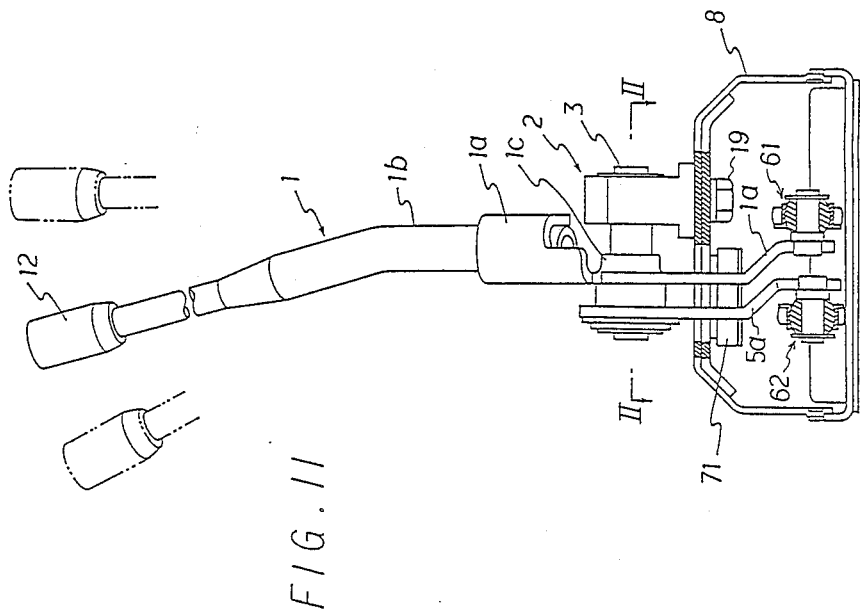
FIG. 11 is a side view of the operating device illustrated in FIG. 8.
Figure 15:
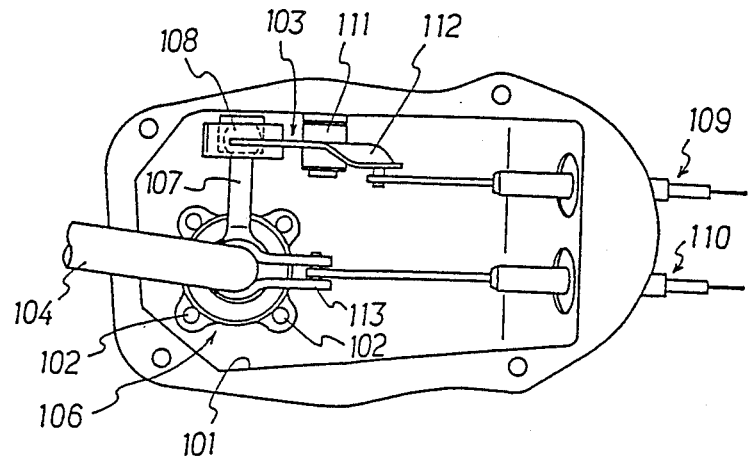
FIG. 15 is a plan view of a prior art operating device for a transmission.
Figure 16:
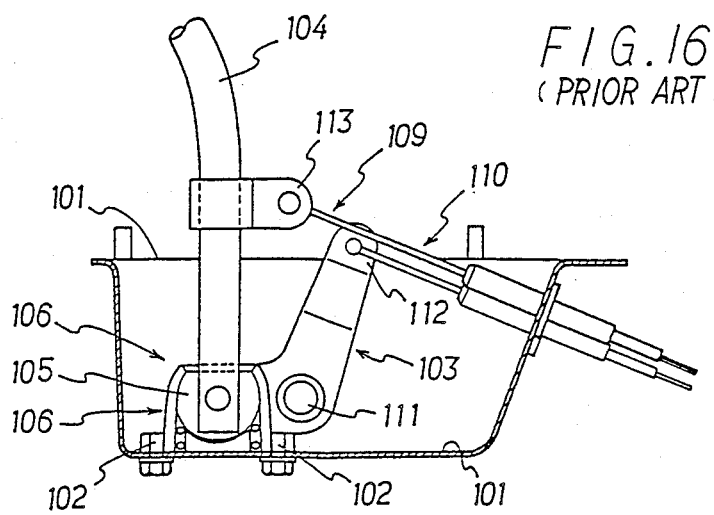
FIG. 16 is a front view of the prior art operating device illustrated in FIG. 15.

The lower end of the adaptor lever 1a is connected with a rod 52 of a shift cable 6 via a bearing 61. The lower portion of the adaptor lever 1a is bent as shown in FIG. 11 so that the location of the shift cable 6 can be under a bearing base 2 for better arrangement.

The bearing base 2 is similar to that in the first embodiment. As shown in FIG. 11, the operating shaft 3 and the fixed shaft 4 are mounted on the bearing base 2 at their ends in the same manner as in the first embodiment. Namely, the supported end of the operating shaft 3 is supported by a bored ball 15 provided in the bearing base 2 rotatably and inclinably. The one end of the fixed shaft 4 is supported directly by the bearing base 2, and the middle portion is supported by a bracket 18.

Figure 12:
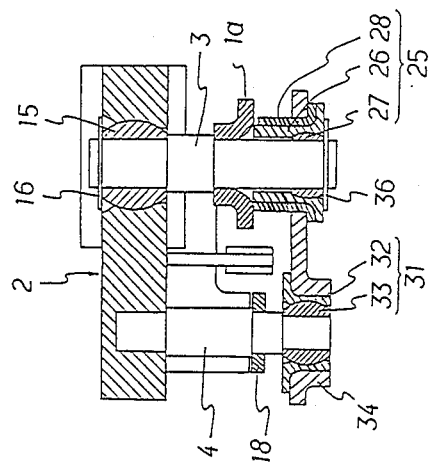
FIG. 12 is a sectional view, taken along the plane as indicated by the line II—II of FIG. 11.

The center portion 5c of the bell crank is supported rotatably and inclinably by the other end of the fixed shaft 4 via a third bearing 31. The second arm 5b of the bell crank 5 is connected rotatably to the free end of the operating shaft 3 via a second bearing 25. The construction of the third bearing 31 is substantially same as that in the first embodiment. The second bearing 25 has a collar 28 as well as a bored ball 27 and a flanged tubular socket 26 as shown in FIG. 12 and is inserted into an opening of the second arm 5b of the bell crank 5. The collar 28 has a flanged tubular shape having a relatively longer tube like the socket 26 and is disposed at the periphery of the socket 26. The collar 28 is provided because the second arm 5b in the second embodiment has no sleeve while in the first embodiment the sleeve 34 is provided. Excepting the above collar 28, the construction of the second bearing 25 is substantially same as that in the first embodiment. The first arm 5a of the bell crank 5 is connected with a rod 53 of a select cable 7 via bearing 62. The first arm 5a is bent as shown in FIG. 11 so that the location of the select cable 7 can be close to the center of the device for better arrangement.

In the above mentioned construction shown in FIG. 8, when the second arm 5b moves in the direction of an arrow A1, the first arm 5a moves in the direction of an arrow A2. On the contrary when the second arm 5b moves in the direction of an arrow B1, the first arm 5a moves in the direction of an arrow B2. Those movements are caused by the inclination of the change lever 1 in the directions of arrows A and B.

A spring 40 is provided on the fixed shaft 4 in order to keep the operating shaft 3 in the intermediate position thereof at the neutral condition. Consequently, the change lever 1 is also kept in the intermediate position thereof at the neutral condition, and is prevented from undesirably moving due to the play. As indicated in FIGS. 13 to 14, a torsional coil spring is used as the spring 40. The spring 40 forms a barrel 41 wound aroung a part of the fixed shaft between the bearing base 2 and the bracket 18. One end 42 of the spring 40 is supported elastically by the bottom surface of the collar 28 surrounding the operating shaft 3, while the other end 43 is supported elastically by the top surface of the collar 28. Other type of spring than the torsional coil spring can serve as the spring 40.

An additional spring 64 is provided on the fixed shaft 4 between the spring 40 and the bearing base 2 to add the upward restoring force so that the required operating force differs depending on the direction in which the change lever 1 is operated. By virtue of the spring 64, it can be avoided that the reverse gear is erroneously selected. One end 65 of the additional spring 64 is buried in the bearing base 2 while the other end 66 thereof is supported elastically at the bottom surface of the collar 28.

A stopper 68 is disposed between the two ends 42, 43 of the spring 40 as illustrated in FIG. 14. The stopper 68 is fixed to the housing by means of an L-shaped piece 69. The surface of the stopper 68 which is contacted by the ends 42, 43 is covered by an elastic material such as rubber. When the operating shaft 3 is inclined upward by the operation of the change lever 1, the upper end 43 of the spring 40 is deflected upward but the lower end 42 is held by the stopper 68. Accordingly the upper end 43 forces the operating shaft 3 downward to restore the shaft to the neutral position thereof. Reversely, when the operating shaft 3 is inclined downward by the operation of the change lever 1, the lower end 42 of the spring 40 is deflected downward but the upper end 43 is held by the stopper 68. Accordingly the lower end 42 forces the operating shaft 3 upward to restore the shaft to the neutral position thereof. As described above, the operating shaft is immediately restored to the neutral position thereof by virtue of the spring 40 and the stopper 68 when an external force is removed from the change lever 1 in the second embodiment.

The shift cable 6 and the select cable 7 are connected as illustrated in FIG. 10. Conduits 46, 47 are respectively fixed to the wall of the housing 8 using cable caps 48, 49. The respective cable caps 48, 49 are fitted with guide pipes 50, 51. Rods 52, 53 are respectively inserted into the guide pipes 50, 51. The exposed end of the rod 52 is connected to the adaptor lever 1a of the change lever 1, while the other end thereof is connected to an inner cable 55 in the conduit 46. The exposed end of the rod 53 is connected to the end of the first arm 5a of the bell crank 5, while the other end thereof is connected to an inner cable 56 in the conduit 47. Therefore, the shift cable 6 is pushed or pulled when the change lever 1 is inclined axially to the shift cable 6, and the select cable 7 is pushed or pulled when the bell crank 5 is rotated.

As indicated in FIG. 9, three stoppers 71, 72, 73 are provided on the housing 8. Each of those stoppers 71, 72, 73 has the substantially same construction as the previously mentioned stopper 68. The adaptor lever 1a of the change lever 1 has a projection 74 and the first arm 5a of the bell crank 5 has a projection 75. These projections 74, 75 are provided to be in contact with the stopper 71.

When the change lever 1 is moved to the position D indicated in FIG. 9, the projection 74 of the adaptor lever 1a comes into contact with the stopper 71. When the change lever 1 is moved to the position C indicated in FIG. 9, another side of the adaptor lever 1a comes into contact with the stopper 73. Thus, the movement of the change lever 1 in the direction C or D indicated in FIG. 8 is restricted. When the change lever 1 is moved in the direction of A or B indicated in FIG. 8, the back side or the projection 75 of the first arm 5a of the bell crank 5 comes into contact with the stopper 71 or 72 respectively, consequently the movement of the change lever 1 is restricted in a manner similar to that described above.

Next, the function of the second embodiment is explained referring to FIG. 8.

The change lever 1 can be inclined in accordance with a conventional H-pattern, because the change lever 1 is supported by the first bearing 14 via the operating shaft 3. When the change lever 1 is inclined in the direction A, the free end of the operating shaft 3 is moved downward in the direction the arrow A1. Then the movement rotates the bell crank 5 so that the first arm 5a moves in the direction of the arrow A2. As a result, the inner wire 56 of the select cable 7 is pulled to provide a select operation of a gear in a transmission (not shown in FIG. 1). On the contrary, when the change lever 1 is inclined in the direction B, the free end of the operating shaft 3 moves upward in the direction of the arrow B1. Then the bell crank 5 is rotated so that the first arm 5a moves in the direction of the arrow B2. As the result, the inner wire 56 of the select cable 7 is pushed to provide a select operation of another gear in a transmission.

Subsequent to the above select operation, when the change lever 1 is inclined in the direction of the arrow C or the arrow D, a shifting operation is provided. Namely, when the change lever 1 is inclined in the direction C, the inner wire 55 of the shift cable 6 is pulled to provide a shift operation of a gear in a transmission. On the contrary when the change lever 1 is inclined in the direction D, the inner wire 55 of the shift cable 6 is pushed to provided a shift operation of another gear in a transmission.

As described above, the second embodiment enables an operation of a transmission in the same manner as in case of a conventional operating device. The second embodiment as well as the first embodiment has an advantageous compact construction compared with the conventional device.

We claim:
1. A transmission operating device comprising:
(a) a change lever;
(b) a shift cable connected to the change lever;
(c) a ball crank having a first arm, a second arm and a middle part therebetween;
(d) a select cable connected to the first arm of the bell crank;
(e) a bearing base;
(f) an operating shaft having a supported end, a free end and a middle part, said middle part being fixed with the change lever;
(g) a first bearing provided on the bearing base to be connected with the support end of the operating shaft rotatably and inclinably;
(h) a second bearing provided at the free end of the operating shaft for rotatable connection with the second arm of the bell crank;
(i) a fixed shaft, of which one end is fixed to the bearing base, projecting from the bearing base;
(j) a third bearing provided at the other end of the fixed shaft to support the middle part of the ball crank rotatably; and
(k) a spring on said fixed shaft with opposite ends engaging said operating shaft.

2. The operating device of Claim 1, wherein the first bearing is an integrated type spherical bearing where a ball is directly mounted in the bearing base without using a separate socket.

3. The operating device of Claim 1, wherein the lower end of the change lever is connected to the operating shaft.

4. The operating device of Claim 1, wherein the middle portion of the change lever is connected to the operating shaft.

* * * * *